(No Model.)
G. K. RICE.
INTERCHANGEABLE COIL SPRING MOTOR AND BRAKE FOR BICYCLES OR TRICYCLES.
No. 533,085. Patented Jan. 29, 1895.
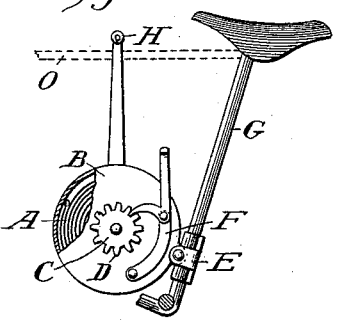
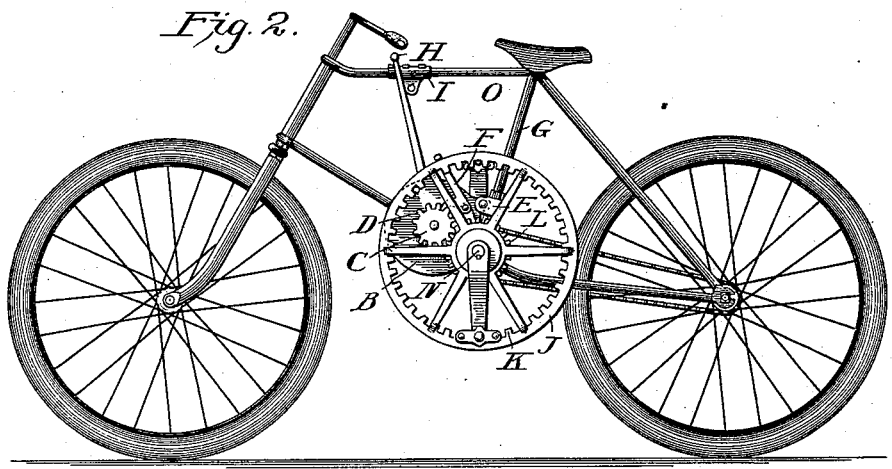
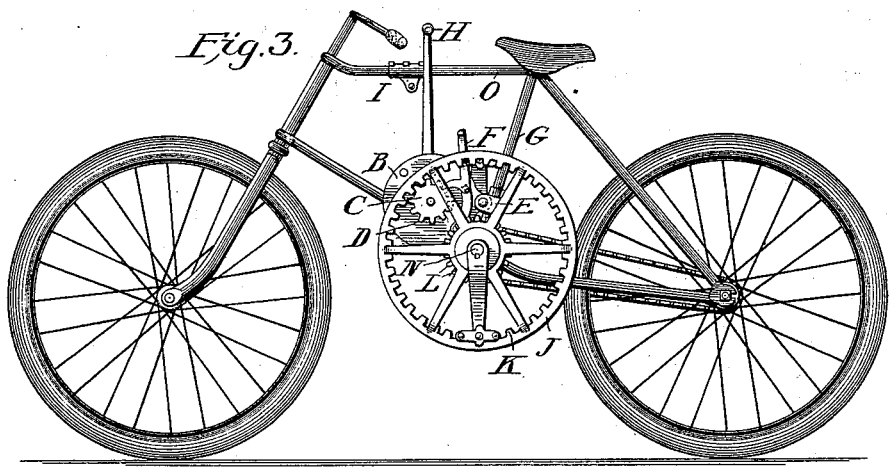
Witnesses
Amsette White
Arthur S. Thompson
Inventor
per George K Rice
Alonzo O Ball
Attorney

UNITED STATES PATENT OFFICE.

GEORGE K. RICE, OF TAYLORVILLE, ILLINOIS.

INTERCHANGEABLE COIL-SPRING MOTOR AND BRAKE FOR BICYCLES OR TRICYCLES.

SPECIFICATION forming part of Letters Patent No. 533,085, dated January 29, 1895.

Application filed October 1, 1894. Serial No. 524,690. (No model.)

*To all whom it may concern:*

Be it known that I, GEORGE K. RICE, a citizen of the United States, residing at Taylorville, in the county of Christian and State of Illinois, have invented a new and useful Improvement in Interchangeable Coil-Spring Motors and Brakes for Bicycles or Tricycles, of which the following is a specification.

My invention relates to improvements in interchangeable coil spring motors and brakes operating in conjunction with a gear on the pedal shaft of a bicycle or tricycle.

The objects of my improvements are, first, to provide on a bicycle or tricycle a coil spring suitably geared to be wound up by resisting the forward momentum of the vehicle on down grade; second, that by the adjustment of the parts, to apply the expansive force of the coil spring for driving the vehicle on up grades. I attain these objects by the mechanism illustrated in the accompanying drawings, in which—

Figure 1, is a detail view of adjustable box with handle, which carries coil spring, shaft, gear wheel, and ratchet. Fig. 2, is a side view of a bicycle, showing the pedal shaft gear, and coil spring gear operating in conjunction as a brake. Fig. 3, is a side view of a bicycle showing the pedal shaft gear and coil spring gear, operating in conjunction as a motor.

Similar letters refer to similar parts throughout the several views.

The adjustable box B (see Fig. 1) with handle H is secured to seat frame G by hinge E. Coil spring A is placed within box B and secured to it, at its outer end. The inner end of coil spring A is secured to shaft C which is journaled in box B. On the outer end of shaft C is secured gear wheel D engaged by ratchet F.

On pedal shaft N (see Fig. 2) is secured a gear wheel J carrying a smaller diameter vertical train of cogs L and a greater diameter inverted train of cogs K with sufficient difference in their diameters, to provide a space on gear wheel J between train of cogs L and train of cogs K for the introduction of gear wheel D without contact with either.

To operate the device as a brake, handle H is adjusted back toward the operator's seat thereby bringing into mesh gear wheel D, and train of cogs K on wheel J, and which are held in mesh by handle H engaging serrations I on frame O. The forward movement of the vehicle now winds up the coil spring A which is secured in coil by ratchet F engaging gear wheel D. (See Fig. 2.)

To operate the device as a motor handle H is adjusted forward, releasing ratchet F and bringing into mesh gear wheel D and train of inner cogs L on wheel J, and which are held in mesh by handle H engaging serrations I on frame O. The expansive force of coil spring A now operates to drive the vehicle forward.

I am aware that prior to my invention machines have been made embodying a coil spring, winding shaft, and gear wheel. Therefore I do not claim such a combination broadly but only so far as they contribute to the operations of my device.

What I do claim as my invention, and desire to secure by Letters Patent, is—

In a spring motor, the combination with a frame G of a drum B, pivotally mounted thereon at one side thereof, a coil spring A, mounted within said drum and a toothed pinion D, mounted upon the outside of the drum in operative connection with said spring, an internally toothed gear wheel J, mounted in the frame N and a toothed pinion L carried thereby, and means for swinging said drum, whereby its pinion may be brought into engagement with either the internally toothed gear wheel or with its pinion substantially as described.

GEORGE K. RICE.

Witnesses:
FRANK ROGERS,
JOHN F. WESTENBERG.